US011489935B2

(12) United States Patent
Rahman et al.

(10) Patent No.: US 11,489,935 B2
(45) Date of Patent: Nov. 1, 2022

(54) COMMUNICATION OF INTER-APPLICATION MESSAGES VIA MESSAGE-ORIENTED MESSAGING SYSTEM

(71) Applicant: Dell Products L.P., Round Rock, TX (US)

(72) Inventors: Mohammed Obaidur Rahman, Hyderabad (IN); Mohammad Gouse, Hyderabad (IN); Durga Prasad Bikkina, Hyderabad (IN)

(73) Assignee: Dell Products L.P., Round Rock, TX (US)

( * ) Notice: Subject to any disclaimer, the term of this patent is extended or adjusted under 35 U.S.C. 154(b) by 55 days.

(21) Appl. No.: 16/780,390

(22) Filed: Feb. 3, 2020

(65) Prior Publication Data

US 2021/0243266 A1    Aug. 5, 2021

(51) Int. Cl.
| | |
|---|---|
| *H04L 29/08* | (2006.01) |
| *H04L 67/55* | (2022.01) |
| *H04L 69/08* | (2022.01) |
| *H04L 67/02* | (2022.01) |
| *G06F 16/23* | (2019.01) |

(52) U.S. Cl.
CPC .......... *H04L 67/55* (2022.05); *G06F 16/2379* (2019.01); *H04L 67/02* (2013.01); *H04L 69/08* (2013.01)

(58) Field of Classification Search
CPC ......... H04L 67/26; H04L 67/02; H04L 69/08; G06F 16/2379
See application file for complete search history.

(56) References Cited

U.S. PATENT DOCUMENTS

| | | | | |
|---|---|---|---|---|
| 8,639,965 | B1* | 1/2014 | Anugu | H04L 67/02 |
| | | | | 714/4.1 |
| 2004/0064570 | A1* | 4/2004 | Tock | H04L 67/327 |
| | | | | 709/228 |
| 2005/0240667 | A1* | 10/2005 | Koegel | G06Q 10/10 |
| | | | | 709/223 |
| 2006/0080120 | A1* | 4/2006 | Tcherevik | G06F 9/542 |
| | | | | 719/318 |
| 2010/0217807 | A1* | 8/2010 | Hawkins | G06F 9/546 |
| | | | | 709/206 |
| 2016/0360387 | A1* | 12/2016 | Smith | H04L 51/38 |
| 2017/0177414 | A1* | 6/2017 | Newbern | G06F 9/5077 |
| 2018/0034650 | A1* | 2/2018 | Anderson | H04L 12/185 |
| 2019/0044899 | A1* | 2/2019 | Hughes | H04L 51/066 |
| 2019/0245856 | A1* | 8/2019 | Irwan | G06F 15/76 |
| 2019/0317847 | A1* | 10/2019 | Fujino | G06F 9/547 |

\* cited by examiner

*Primary Examiner* — Shean Tokuta
*Assistant Examiner* — Juan C Turriate Gastulo
(74) *Attorney, Agent, or Firm* — Terrile, Cannatti & Chambers, LLP; Emmanuel A. Rivera

(57) ABSTRACT

Technology that facilitates communication of inter-application messages via a message-oriented messaging (MOM) system is disclosed. Exemplary implementations may: intercept an inter-application message from a publisher that is destined for a subscriber; convert the intercepted message into a proprietary format of a MOM system; transmit converted message to the MOM system; receive a MOM-processed message from the MOM system; transform the MOM-processed message from the MOM-system proprietary format to the hypertext transfer protocol; and send the transformed message to the subscriber using the hypertext transfer protocol.

20 Claims, 8 Drawing Sheets

COMMUNICATION OF INTER-APPLICATION MESSAGES VIA MESSAGE-ORIENTED MESSAGING SYSTEM

BACKGROUND

Message-oriented middleware (MOM) is an infrastructure that supports the sending and receiving of messages between distributed systems. With MOM, communication is simplified between application modules that are distributed across heterogeneous platforms. The middleware creates a distributed communications layer that insulates the application developer from the details of the various operating systems and network interfaces.

MOM is a concept that involves the passing of data between applications using a communication channel that carries "messages," which are self-contained units of information. In a MOM-based communication environment, messages are usually sent and received asynchronously. Using message-based communications, applications are abstractly decoupled; and senders and receivers do not need to be aware of each other. Instead, they send and receive messages to and from the messaging system. It is the responsibility of the MOM messaging system to get the messages to their intended destinations.

SUMMARY

One aspect of the present disclosure relates to a system configured that facilitates the communication of inter-application messages via a message-oriented messaging system. The system may include one or more hardware processors configured by machine-readable instructions. The processor(s) may be configured to intercept an inter-application message from a publisher that is destined for a subscriber. The inter-application message may be formatted and transmitted using a hypertext transfer protocol over a communication network. The processor(s) may be configured to convert the intercepted message into a proprietary format of a MOM system. The processor(s) may be configured to transmit a converted message to the MOM system. The processor(s) may be configured to receive a MOM-processed message from the MOM system. The MOM-processed message may be converted message after being processed by the MOM system. The processor(s) may be configured to transform the MOM-processed message from the MOM-system proprietary format to the hypertext transfer protocol. The processor(s) may be configured to send the transformed message to the subscriber using the hypertext transfer protocol.

Another aspect of the present disclosure relates to a method that facilitates the communication of inter-application messages via a message-oriented messaging system. The method may include intercepting an inter-application message from a publisher that is destined for a subscriber. The inter-application message may be formatted and transmitted using a hypertext transfer protocol over a communication network. The method may include converting the intercepted message into a proprietary format of a MOM system. The method may include transmitting a converted message to the MOM system. The method may include receiving a MOM-processed message from the MOM system. The MOM-processed message may be converted message after being processed by the MOM system. The method may include transforming the MOM-processed message from the MOM-system proprietary format to the hypertext transfer protocol. The method may include sending the transformed message to the subscriber using the hypertext transfer protocol.

Yet another aspect of the present disclosure relates to a computing platform configured that facilitates communication of inter-application messages via a message-oriented messaging system. The computing platform may include a non-transient computer-readable storage medium having executable instructions embodied thereon. The computing platform may include one or more hardware processors configured to execute the instructions. The processor(s) may execute the instructions to intercept an inter-application message from a publisher that is destined for a subscriber. The inter-application message may be formatted and transmitted using a hypertext transfer protocol over a communication network. The processor(s) may execute the instructions to convert the intercepted message into a proprietary format of a MOM system. The processor(s) may execute the instructions to transmit the converted message to the MOM system. The processor(s) may execute the instructions to receive a MOM-processed message from the MOM system. The MOM-processed message may be converted message after being processed by the MOM system. The processor(s) may execute the instructions to transform the MOM-processed message from the MOM-system proprietary format to the hypertext transfer protocol. The processor(s) may execute the instructions to send the transformed message to the subscriber using the hypertext transfer protocol.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

A technology that facilitates communication of inter-application messages via a message-oriented messaging (MOM) system is disclosed. Exemplary implementations may: intercept an inter-application message from a publisher that is destined for a subscriber; convert the intercepted message into a proprietary format of a mom system; transmit converted message to the mom system; receive a MOM-processed message from the mom system; transform the MOM-processed message from the MOM-system proprietary format to the hypertext transfer protocol; and send the transformed message to the subscriber using the hypertext transfer protocol.

A message-oriented messaging (MOM) system supports the sending and receiving of messages between distributed systems. MOM systems often employ software called message-oriented middleware, which also uses the acrostic MOM. As used herein, message-oriented messaging and message-oriented middleware refer to the same functionality. Thus, the MOM acrostic refers to either term herein.

With the MOM system, a publisher (i.e., a sender) sends an inter-application message to a subscriber (i.e., receiver) even though each may be on heterogeneous platforms. The publisher and subscriber are application modules (e.g., programs, operating systems, applications) on different distributed computing systems that communicate messages from the publisher to the subscriber across a distributed communications network.

In addition, the MOM systems typically queue the messages so that the subscriber does not need to be available when the message is sent. Thus, the overall communication of the messages is asynchronous.

With this arrangement, the subscribers and publishers are agnostic to the protocol or format of the other. However, the subscribers and publishers need to be aware of the proprietary format that the particular MOM system employs. That is, the publishers and subscribers must be informed on how to send and receive to the MOM systems and how the MOM messages may be formatted.

There are many proprietary MOM systems available. For example, those may include IBM Websphere MQ, RabbitMQ, MSMQ, Qpid, ActiveMQ, kafka, Apache Storm, Flink, and Flume. Also, each of these proprietary systems is updated from time to time with new versions. Therefore, with the installation of a new version of an existing proprietary MOM system or of a new system, each publisher and subscriber must be updated to reflect these changes. That is not so with the technology described herein.

Figure 1:
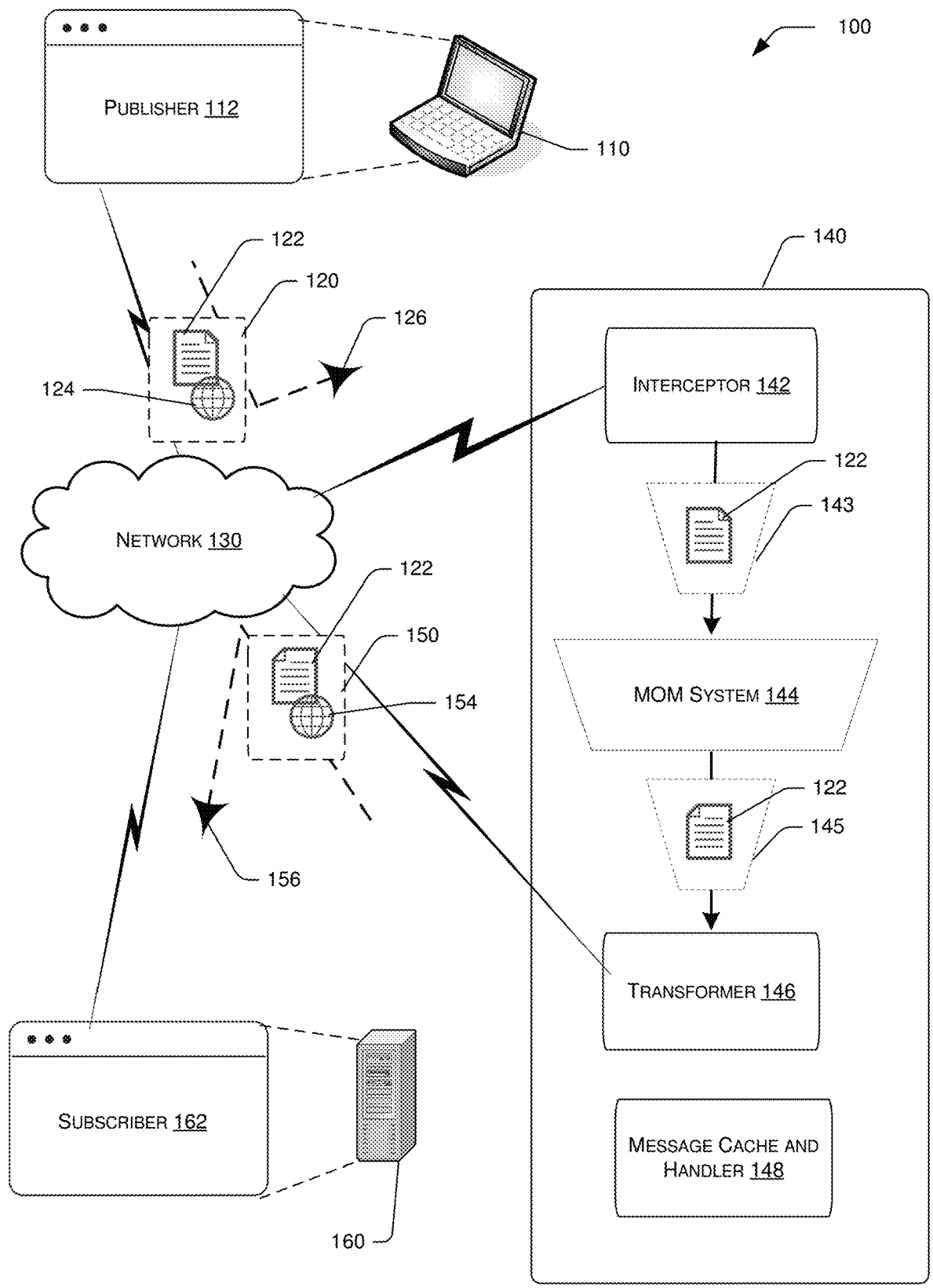
FIG. 1 illustrates an example information handling scenario 100 suitable to implement with a system configured to facilitate communication of inter-application messages via a message-oriented messaging system, in accordance with one or more implementations.

FIG. 1 is a generalized illustration of an example information handling scenario 100 that can be employed as an example system 140. This example system 140 is configured to facilitate communication of inter-application messages via a message-oriented messaging (MOM) system in accordance with one or more implementations.

The example information handling scenario 100 includes a publisher system 110, a communications network 130, the example system 140, and a subscriber system 160.

The communications network 130 is an infrastructure of interconnected and distributed devices and networks that cooperate together to transmit data thereacross.

Some implementations of the communications network 130 may provide access to network-accessible resources (e.g., documents, data, and such) that are identified by uniform resource identifiers (URIs), which may be inter-linked by hypermedia. The resources on such implementations may be transferred using the Hypertext Transfer Protocol (HTTP). Services available on such implementations may be called web services.

As depicted, the publisher system 110 is a laptop computer with a publisher 112 executing thereon. The publisher 112 is an application module that is configured to send messages asynchronously to another application module on another system over a distributed network. The other application module is called a subscriber. The message is called an inter-application message.

The publisher 112 composes an inter-application message 122, which is part of a message package 120. The message package 120 is formatted and sent via particular protocols so as to facilitate the transmission over the communications network 130. While the inter-application message 122 is ultimately destined for a subscriber 162, the message packet 120 is addressed to the example system 140.

The message package 120 includes the inter-application message 122 itself that has been formatted to be sent and is sent using a hypertext transfer protocol over the communications network 130. A globe symbol 124 indicates that the inter-application message 122 has been formatted to be sent and is sent using a hypertext transfer protocol over the communications network 130.

A hypertext transfer protocol (HTTP) is an application-layer protocol for transmitting hypermedia documents, such as HTML. It was designed for communication between web browsers and web servers, but it can also be used for other purposes. HTTP follows a classical client-server model, with a client opening a connection to make a request, then waiting until it receives a response. HTTP is a stateless protocol, meaning that the server does not keep any data (state) between two requests. Though often based on a TCP/IP layer, it can be used on any reliable transport layer, that is, a protocol that doesn't lose messages silently like UDP does. RUDP—the reliable update of UDP—is a suitable alternative.

Examples of the format and hypertext transfer protocol that may be used over the communications network 130 include representational state transfer (REST). Indeed, sending of the message package 120 may be accomplished by REST web services. In some implementations, this may be accomplished by using an application programming interface (API) for the appropriate web service.

A REST or RESTful web service allows a requesting system to access and manipulate textual representations of network-accessible resources by using a uniform and pre-defined set of stateless operations.

Using a hypertext transfer protocol and a messaging web service (such as REST), the publisher 112 formats and sends the message package 120 that includes an inter-application message 122 that is destined for the subscriber 162. Using a REST API, the message package is addressed to the example system 140. Using the communications network 130, the arrow 126 shows the travel of the message package 120 from the publisher 112 to the example system 140.

The example system 140 includes an interceptor 142, a transformer 146, and a message cache and handler 148. As depicted, a MOM system 144 is shown as part of the example system 140. In some implementations, this may be so. However, in other implementations, the MOM system 144 may be separate from the example 140. For example, the MOM system 144 may be a different application module executing on the same computing system like the one or more application modules executing the example system 140. In another example, the MOM system 144 may be tightly coupled to the example system 140.

Without the technology described herein, the message package would be formatted in a proprietary manner for receipt by a MOM system. Instead, the message package 120 is formatted using widely available formats and hypertext transfer protocols.

The interceptor 142 receives the message package 120. This can be viewed as an interception since receives the message 122 that otherwise would have gone directly to a MOM system when using conventional approaches.

The interceptor 142 converts the intercepted message into a proprietary format of the MOM system 144.

As depicted, the interceptor 142 transmits converted message 143 to the MOM system 144. The converted message 143 retains the original content of the original message 122, but the format and/or protocol may have been changed to enable interaction with the MOM system 144.

The MOM system 144 performs its message-oriented middleware function as it traditionally does. It is unaware of the interception of and conversion of the incoming message. Instead, the MOM system 144 operates as it did before the introduction of the technology described herein.

The MOM system 144 processes the message to produce a MOM-processed message 145. The MOM-processed message 145 retains the original content of the original message 122.

The MOM system 144 sends and the transformer 146 receives the MOM-processed message 145. The transformer 146 transforms the MOM-processed message 145 from the MOM-system proprietary format to the hypertext transfer protocol. That same hypertext transfer protocol used above in the intercepted message.

Using a hypertext transfer protocol and a messaging web service (such as REST), the transformer 146 sends a transformed message (as represented by a transformed message package 150) that is destined for the subscriber 162. Using a REST API, the transformed message package 150 is addressed to the subscriber 162. Using the communications network 130, the arrow 156 shows the travel of the transformed message package 150 from the example system 140 to the subscriber 162.

The transformed message package 150 includes the inter-application message 122 itself that has been formatted to be sent and is sent using a hypertext transfer protocol over the communications network 130. A globe symbol 154 indicates that the inter-application message 122 has been formatted to be sent and is sent using a hypertext transfer protocol over the communications network 130.

As depicted, the subscriber system 160 is a server computing system with the subscriber 162 executing thereon. The subscriber 162 is an application module that is configured to receive inter-application messages asynchronously from another application module on another system over a distributed network.

The message cache and handler 148 provide additional functionalities for the example system 140. The message cache and handler 148 stores inter-application messages that pass through the example system 140. From the cache of messages, the message cache and handler 148 enables message recovery. In addition, the message cache and handler 148 can provide data analytics of the messages and additional message security.

With message recovery, the message cache and handler 148 queues an unreceived message for resending later once the subscriber is available. For message recovery, the message cache and handler 148, before the sending, determines that the subscriber 162 was unavailable to receive the transformed message. In response to the determination that the subscriber 162 is unavailable, the message cache and handler 148 flags the transformed message for recovery.

When the message cache and handler 148 determines that a previously unavailable subscriber is available to receive the transformed message, the message cache and handler 148 sends the flagged message to the subscriber using the hypertext transfer protocol.

Figure 2:
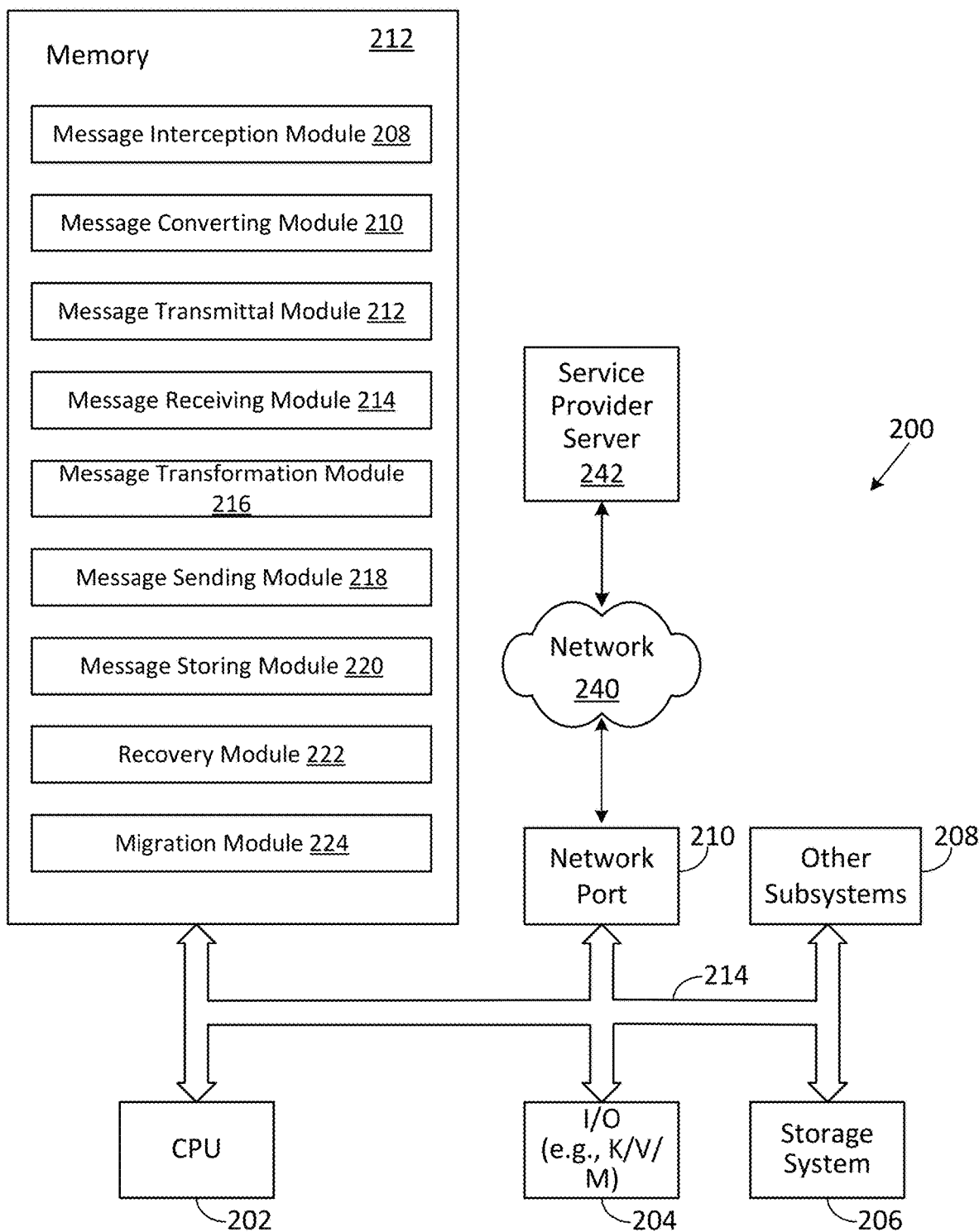
FIG. 2 illustrates an example system configured to facilitate communication of inter-application messages via a message-oriented messaging system, in accordance with one or more implementations.

FIG. 2 is a generalized illustration of an information handling system that can be used to implement the example system 200. This example system configured to that facilitates communication of inter-application messages via a message-oriented messaging system in accordance with one or more implementations.

Message interception module 208 may be configured to intercept an inter-application message from a publisher that is destined for a subscriber. The inter-application message may be formatted and transmitted using a hypertext transfer protocol over a communication network. The hypertext transfer protocol may include Hypertext Transfer Protocol. The communication network may be based on Transmission Control Protocol and the Internet Protocol.

Message converting module 210 may be configured to convert the intercepted message into a proprietary format of a MOM system. Herein, a proprietary format includes a particular set of syntax, semantics, and protocol associated with the MOM system.

Message transmittal module 212 may be configured to transmit a converted message to the MOM system.

Message receiving module 214 may be configured to receive a MOM-processed message from the MOM system. The MOM-processed message may be converted message after being processed by the MOM system.

Message transformation module 216 may be configured to transform the MOM-processed message from the MOM-system proprietary format to the hypertext transfer protocol.

Message sending module 218 may be configured to send the transformed message to the subscriber using the hypertext transfer protocol.

Message sending module 218 may be configured to, in response to the that a previously unavailable subscriber is available, send the flagged message to the subscriber using the hypertext transfer protocol.

Message storing module 220 may be configured to store the inter-application message.

Recovery module 222 may be configured to, before the sending, determine whether the subscriber was unavailable to receive the transformed message. Recovery module 222 may be configured to, in response to the determination that the subscriber is unavailable, flag the transformed message for recovery. Recovery module 222 may also be configured to determine that a previously unavailable subscriber is available to receive the transformed message.

Migration module 224 may be configured to migrate from one MOM system to a different MOM system. Migration module 224 may be configured to decommission the old MOM system.

In some implementations, intercepting and sending may be performed by representational state transfer (REST) web services. In some implementations, performed by the system may utilize the platform as a service that uses operating-system (OS) level virtualization.

The example system 200 may include one or more processors configured to execute computer program modules. By way of non-limiting example, the example system 200 may include one or more of a desktop computer, a server, a laptop computer, a handheld computer, a tablet computing platform, a NetBook, a Smartphone, a gaming console, and/or other computing platforms.

Storage system 206 may comprise non-transitory storage media that electronically stores information. The electronic storage media of storage system 206 may include one or both of system storage that is provided integrally (i.e., substantially non-removable) from a computer and/or removable storage that is removably connectable to a computer via, for example, a port (e.g., a USB port, a firewire port, etc.) or a drive (e.g., a disk drive, etc.). Storage system 206 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 206 may include one or more virtual storage resources (e.g., cloud storage, a virtual private network, and/or other virtual storage resources). Storage system 206 may store software algorithms, information determined by processor(s) 202, information received from a server, information received from a client computing platform(s), and/or other information that enables the example routing-script verification system 200 to function as described herein.

Processor(s) 202 may be configured to provide information processing capabilities. As such, processor(s) 202 may include one or more of a digital processor, an analog processor, a digital circuit designed to process information, an analog circuit designed to process information, a state machine, and/or other mechanisms for electronically processing information. Although processor(s) 202 is shown in FIG. 2 as a single entity, this is for illustrative purposes only. In some implementations, processor(s) 202 may include a plurality of processing units. These processing units may be physically located within the same device, or processor(s) 202 may represent processing functionality of a plurality of devices operating in coordination.

Processor(s) 202 may be configured to execute modules 208, 210, 212, 214, 216, 218, 220, 222, and/or 224, and/or other modules. Processor(s) 202 may be configured to execute modules 208, 210, 212, 214, 216, 218, 220, 222, and/or 224, and/or other modules by software; hardware; firmware; some combination of software, hardware, and/or firmware; and/or other mechanisms for configuring processing capabilities on processor(s) 202. As used herein, the term "module" may refer to any component or set of components that perform the functionality attributed to the module. This may include one or more physical processors during the execution of processor-readable instructions, the processor-readable instructions, circuitry, hardware, storage media, or any other components.

It should be appreciated that although modules 208, 210, 212, 214, 216, 218, 220, 222, and/or 224 are illustrated in FIG. 2 as being implemented within a single processing unit, in implementations in which processor(s) 202 includes multiple processing units, one or more of modules 208, 210, 212, 214, 216, 218, 220, 222, and/or 224 may be implemented remotely from the other modules. The description of the functionality provided by the different modules 208, 210, 212, 214, 216, 218, 220, 222, and/or 224 described below is for illustrative purposes, and is not intended to be limiting, as any of modules 208, 210, 212, 214, 216, 218, 220, 222, and/or 224 may provide more or less functionality than is described. For example, one or more of modules 208, 210, 212, 214, 216, 218, 220, 222, and/or 224 may be eliminated, and some or all of its functionality may be provided by other ones of modules 208, 210, 212, 214, 216, 218, 220, 222, and/or 224. As another example, processor(s) 202 may be configured to execute one or more additional modules that may perform some or all of the functionality attributed below to one of modules 208, 210, 212, 214, 216, 218, 220, 222, and/or 224.

Figure 3:
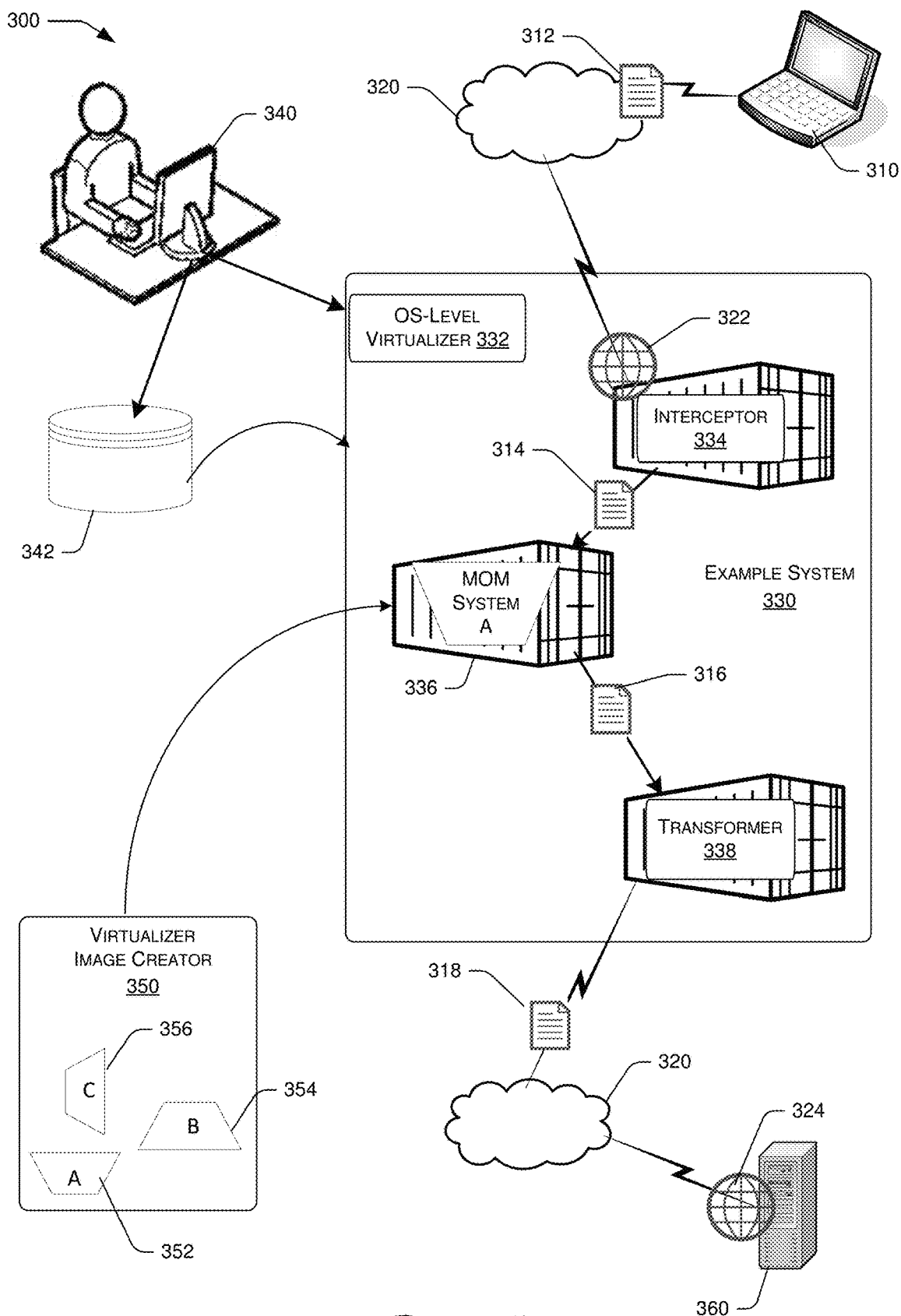
FIG. 3 illustrates another example system configured to facilitate communication of inter-application messages via a message-oriented messaging system, in accordance with one or more implementations.

FIG. 3 is a generalized illustration of an example information handling scenario 300 that can be employed as an example system 330. This example system 330 is configured to facilitate communication of inter-application messages via a message-oriented messaging (MOM) system in accordance with one or more implementations.

The example information handling scenario 300 illustrates an instance that employs operating-system (OS) level virtualization to create and/or manage the entities that perform the functions of the example information handling scenario 300.

OS-level virtualization is a type of virtualization technology that works on the level of the operating system. The OS-level virtualization refers to an operating system paradigm in which the kernel allows the existence of multiple isolated user-space instances. Such instances are called containers (e.g., Solaris, Docker), Zones (e.g., Solaris), virtual private servers (e.g., OpenVZ), partitions, virtual environments (VEs), virtual kernel (e.g., DragonFly BSD), or jails (e.g., FreeBSD jail or chroot jail). Herein, the term container is used.

A container may look like real computers from the point of view of programs running in them. A computer program running on an ordinary operating system can see all resources (e.g., connected devices, files and folders, network shares, computing power, quantifiable hardware capabilities) of that computer. However, programs running inside of a container can only see the container's contents and devices assigned to the container.

The example information handling scenario 300 includes a publisher system 310, a communications network 320, the example system 330, and a subscriber system 360. The example information handling scenario 300 also includes a self-service portal 340, a perimeter database 342, and a virtualization image creator 350.

The communications network 320 is like the communications network 120 described herein.

As depicted, the publisher 310 has a publisher application executing thereon. The publisher application is like the publisher 112 described herein. For simplicity, the publisher 310 will represent the publisher application this description of FIG. 3.

The publisher 310 composes an inter-application message 312. The publisher 310 formats the message 312 so as to facilitate the transmission using a hypertext transfer protocol over the communications network 320. While the inter-application message 312 is ultimately destined for a subscriber 360, the inter-application message 312 is addressed to the example system 330.

The example system 330 includes an OS-level virtualizer 332, which creates and manages containers, such as the interceptor 334, MOM system 336, and transformer 338. An example of such an OS-level virtualizer 332 is a Docker daemon. A REST API endpoint listens for appropriate API requests and the Docker daemon manages OS-level virtualization objects such as images, containers, networks, and volumes.

The virtualization image creator 350 includes a storage and distribution system for OS-Level virtualization images. An image is a file, comprised of multiple layers, used to execute instructions in a container. An image is built from the instructions for a complete and executable version of an application, which relies on a host OS kernel. When the OS-Level virtualization system runs an image, it becomes one or multiple instances of that container.

As depicted, the virtualization image creator 350 has multiple stored images of MOM systems: MOM system-A 352, MOM system B 354, and MOM system C 356. As indicated by arrow 358, the virtualization image creator 350 generated a container 336 for the example system 330 based on MOM system-A 352.

Using a self-service portal (SSP), a system administrator may select which of the MOM system images from which to create a container. Also, the administrator may select various parameters for the MOM system container 336 and for the interceptor 334 and transformer 338. These selections and parameters are stored in the perimeter database 342.

Using the parameters from the parameter database 342 and input from the SSP 340, the example system 330 creates a container for the interceptor 332. The globe symbol 322 represents a REST web service that services the handling of message 312 using the hypertext transfer protocol.

The interceptor 334 receives message 312. The interceptor 334 converts the intercepted message into a proprietary format of the MOM system 336.

As depicted, the interceptor 334 transmits the converted message 314 to the MOM system 336. The converted message 314 retains the original content of the original message 312, but the format and/or protocol may have been changed to enable interaction with the MOM system 336.

The MOM system 336 performs its message-oriented middleware function as it traditionally does. It is unaware of the interception of and conversion of the incoming message. Instead, the MOM system 336 operates as it did before the introduction of the technology described herein.

The MOM system 336 processes the message to produce a MOM-processed message 316. The MOM-processed message 316 retains the original content of the original message 312. The MOM system 336 reformatted the original message so that the subscriber could receive and consume it effectively.

The MOM system 336 sends and the transformer 338 receives the MOM-processed message 316. The transformer 338 transforms the MOM-processed message 316 from the MOM-system proprietary format to the hypertext transfer protocol. That same hypertext transfer protocol used above in the intercepted message.

Using a hypertext transfer protocol (such as HTTP) and a messaging web service (such as REST), the transformer 338 sends a transformed message 318 that is destined for the subscriber 360 over the communications network 320. Using a REST API 324, the transformed message 318 is received by the subscriber 360.

As depicted, the subscriber 360 has a subscriber application executing thereon. The subscriber application is like the subscriber 162 described herein. For simplicity, the subscriber 360 represents the subscriber application this description of FIG. 3.

Figure 4A:
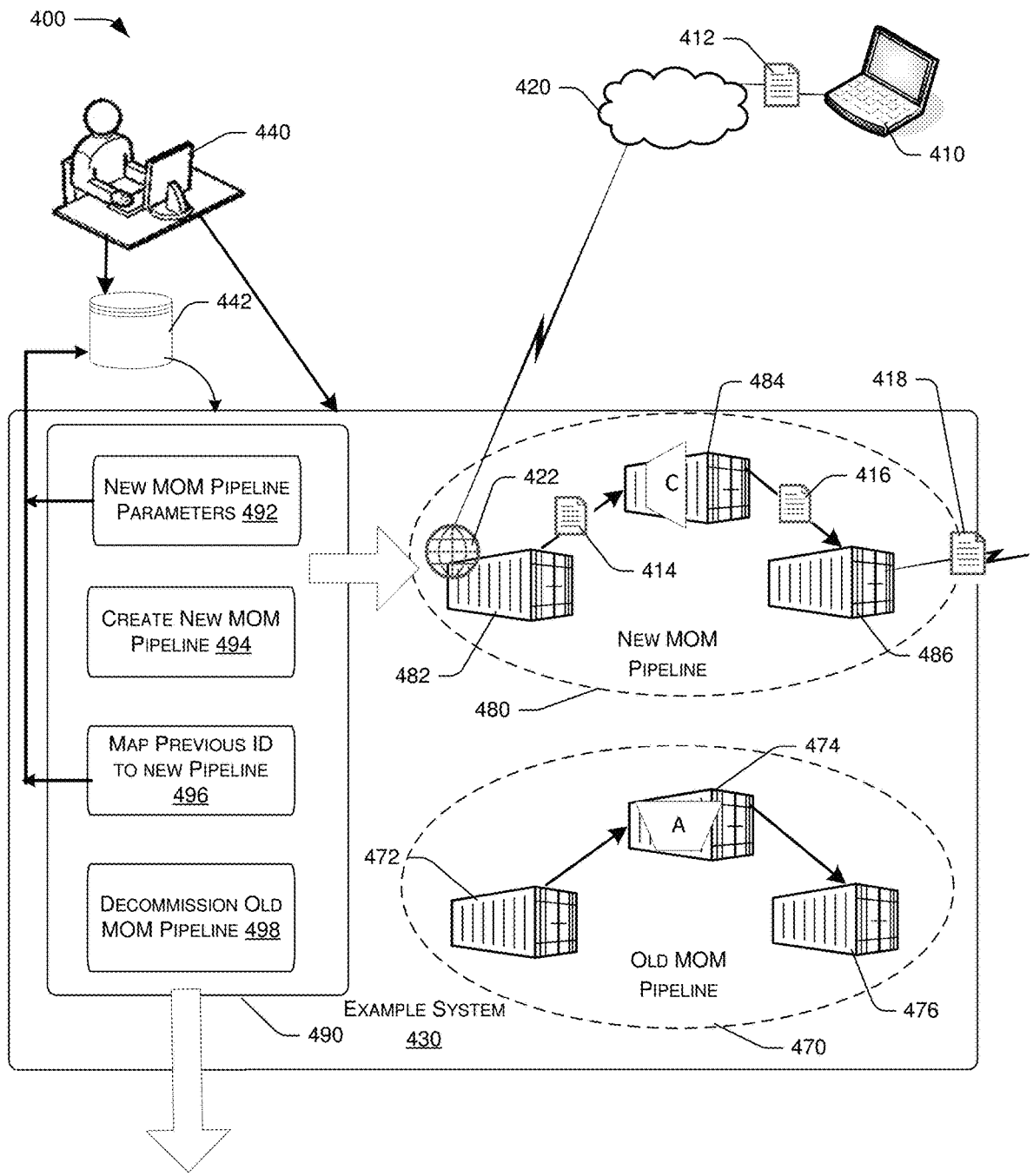
FIGS. 4A and 4B illustrate another example system configured to facilitate communication of inter-application messages via a message-oriented messaging (MOM) system by facilitating a seamless transition from one type of MOM system to another, in accordance with one or more implementations.
Figure 4B:
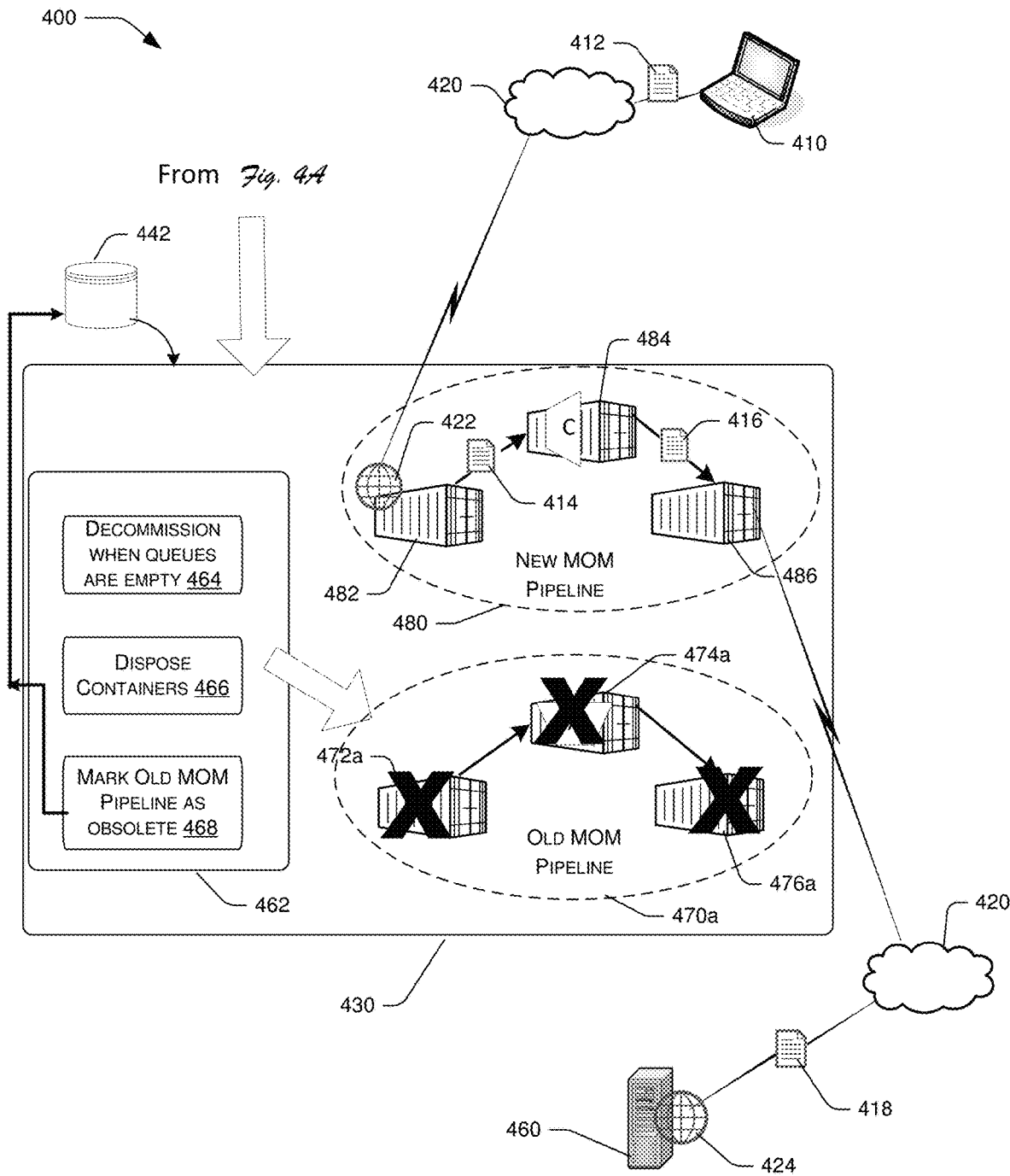

FIGS. 4A and 4B is a generalized illustration of an example information handling scenario 400 that can be employed as an example system 430 that is configured to facilitate communication of inter-application messages via a message-oriented messaging (MOM) system by facilitating a seamless transition from one type of MOM system to another, in accordance with one or more implementations.

The example information handling scenario 400 illustrates an instance that employs operating-system (OS) level virtualization to create and/or manage the entities that perform the functions of the example information handling scenario 400.

The example information handling scenario 400 includes a publisher system 410, a communications network 420, the example system 430, and a subscriber system 460. The example information handling scenario 400 also includes a self-service portal 440, and a perimeter database 442.

The communications network 420 is like the communications network 120 described herein.

As depicted, the publisher 410 has a publisher application executing thereon. The publisher application is like the publisher 112 described herein. For simplicity, the publisher 410 will represent the publisher application this description of FIG. 3.

The publisher 410 composes an inter-application message 412. The publisher 410 formats the message 412 so as to facilitate the transmission using a hypertext transfer protocol over the communications network 420. While the inter-application message 412 is ultimately destined for a subscriber 460, the inter-application message 412 is addressed to the example system 430.

The example system 430 includes an OS-level virtualizer (not shown) like the OS-level virtualizer described herein. This OS-level virtualizer creates and maintains containers shown as part of the example system 430.

In FIG. 4A, an old MOM pipeline 470 is depicted inside a dashed oval. The old MOM pipeline 470 includes an interceptor 472, MOM system-A 474, and a transformer 476. In the example information handling scenario 400 shown in FIG. 4A, the old MOM pipeline 470 is a functioning pipeline that employs the MOM system-A 474 for inter-application message communication. Thus, before the transition to another MOM system, the publisher 410 sends messages to the subscriber 460 via the old MOM pipeline 470.

MOM-system migrator 490 is part of the example system 430. Using the OS-level virtualizer, the MOM-system migrator 490 generates a new MOM pipeline 480. The new MOM pipeline 480 includes an interceptor 482, MOM system-C 484, and a transformer 486. In the example information handling scenario 400 shown in FIG. 4A, the new MOM pipeline 480 ultimately replaces the old MOM pipeline 470.

The MOM-system migrator 490 creates the new MOM pipeline 480 by, at 492, creating new parameters in the perimeter database 442 for the new MOM pipeline 480; creating, at 494, the new MOM pipeline 480 based on those parameters; mapping, at 496, a previous identification used for the old MOM pipeline 470 to the new MOM pipeline 480; and initiating, at 498, a decommission of the old MOM pipeline.

An example of a previous identification that was used for the old MOM pipeline 470 but is not reassigned to the new MOM pipeline 480 is a uniform resource identifier (URI) or uniform resource locator (URL). In the context of the so-called Internet or World Wide Web, such URIs or URLs may be called web addresses.

MOM-system decommissioner 462 is part of the example system 430. Using the OS-level virtualizer, the MOM-system decommissioner 462 decommissions the old MOM pipeline 470. FIG. 4B shows the decommissioned MOM pipeline 470a.

The MOM-system system decommissioner 462 decommissions the old MOM pipeline 470 by, at 464, initiating decommissioning once the message queues of the old MOM pipeline 470 are empty; disposing, at 466, the containers of the decommissioned MOM pipeline 470a, which are interceptor 472a, old MOM system 474a, and transformer 476a; and marking, at 468, in the database 442 that the old MOM pipeline is obsolete and not to be used.

Once created, the interceptor 482 of the new MOM pipeline 480 receives the message 412 via a REST API 422. The interceptor 482 converts the message 412 and transmits the converted message 414 to the MOM system-C 484. The converted message 414 retains the original content of the original message 412, but the format and/or protocol may have been changed to enable interaction with the MOM system-C 484.

The MOM system-C 484 performs its message-oriented middleware function. The MOM system-C 484 processes the message to produce a MOM-processed message 416. The MOM-processed message 416 retains the original content of the original message 412. The MOM system-C 484 reformatted the original message so that the subscriber 460 could receive and consume it effectively.

The MOM system-C 484 sends and the transformer 486 receives the MOM-processed message 416. The transformer 486 transforms the MOM-processed message 416 from the MOM-system-C proprietary format to the hypertext transfer protocol. That same hypertext transfer protocol used above in the intercepted message.

Using a hypertext transfer protocol (such as HTTP) and a messaging web service (such as REST), the transformer 486 sends a transformed message 418 that is destined for the subscriber 460 over the communications network 420. Using a REST API 424, the transformed message 418 is received by the subscriber 460

Seamless MOM System Transition

Using the example information handling scenario 400, one may perform a seamless transition from one type of MOM system to another employing the technology described herein. Often, an enterprise migrates from a proprietary MOM system to another proprietary MOM system. As shown in FIGS. 4A and 4B, the example information handling scenario 400 involves a transition from the MOM system-A 474 to the MOM system-C 484. In some instances, the transition may be an upgrade to a different version of the same proprietary MOM system. Regardless, the seamless migration procedure is performed similarly.

This transition or migration is called seamless because the publisher and subscriber can remain blissfully unaware of the change. In addition, it is called seamless because after initiating the migration, the system administrator does little to nothing else to enable or complete the migration. Rather, the seamless migration process itself automatically performs all tasks necessary to complete a successful migration. The seamless migration process will be described with references to FIGS. 4A and 4B.

Before a migration is initiated, a publisher 410 uses the so-called old MOM pipeline 470 to send messages to the subscriber 460. The example system 430 routes the publisher's message 412 to the interceptor 472, which converts and directs the message to the MOM system-A 474. The transformer 476 receives the MOM-processed message from the MOM system-A 474 and then the transformer 476 sends that message to the subscriber 460.

Using the self-service portal (SSP 440), a system administrator initiates a seamless transition from the MOM system-A 471 to MOM system-C 484. This triggers the MOM-system migrator 490 to generate the new MOM pipeline 480.

At 492, MOM-system migrator 490 creates the new MOM pipeline 480 by creating new parameters in the perimeter database 442 for the new MOM pipeline 480.

At 494, MOM-system migrator 490 creates the new MOM pipeline 480 based on those parameters.

At 496, MOM-system migrator 490 maps a previous identification used for the old MOM pipeline 470 to the new MOM pipeline 480. For example, the URI used to direct messages to the old MOM pipeline 470 is reassigned to the new MOM pipeline 480.

At this point, all new incoming messages from the publisher 410 will arrive at the new MOM pipeline 480. The old MOM pipeline 470 is still active, but it does not receive any new incoming messages from the publisher 410.

At 498, MOM-system migrator 490 triggers a decommission of the old MOM pipeline 470. This triggers the MOM-system decommissioner 462, which decommissions the old MOM pipeline 470. FIG. 4B shows the decommissioned MOM pipeline 470a.

At 464, the MOM-system decommissioner 462 monitors the message queue of the old MOM pipeline 470. Once the queue is empty—thus no more messages needed to be processed by the old MOM pipeline 470—the MOM-system decommissioner 462 initiates decommissioning of that pipeline.

At 466, the MOM-system decommissioner 462 disposes the containers of the decommissioned MOM pipeline 470a, which are interceptor 472a, old MOM system 474a, and transformer 476a.

At 468, the MOM-system decommissioner 462 updates the database 442 that the old MOM pipeline is obsolete and not to be used.

The actions at 466 and 468 clear up resources, memory, and configuration information to remove the remnants of the decommissioned MOM pipeline 470a.

Figure 5A:
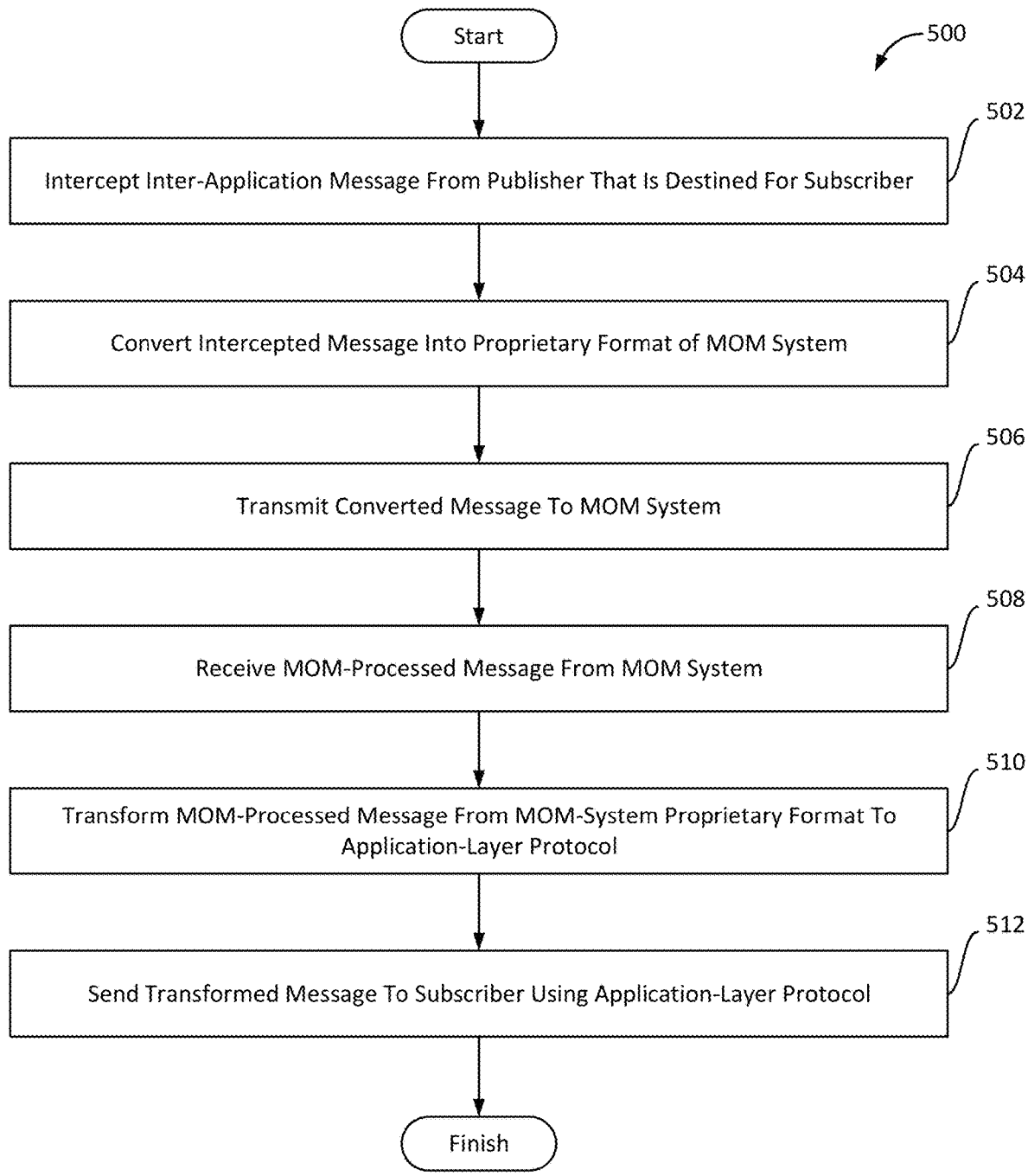
FIGS. 5A, 5B, and/or 5C illustrates a method that facilitates communication of inter-application messages via a message-oriented messaging system, in accordance with one or more implementations.
Figure 5B:
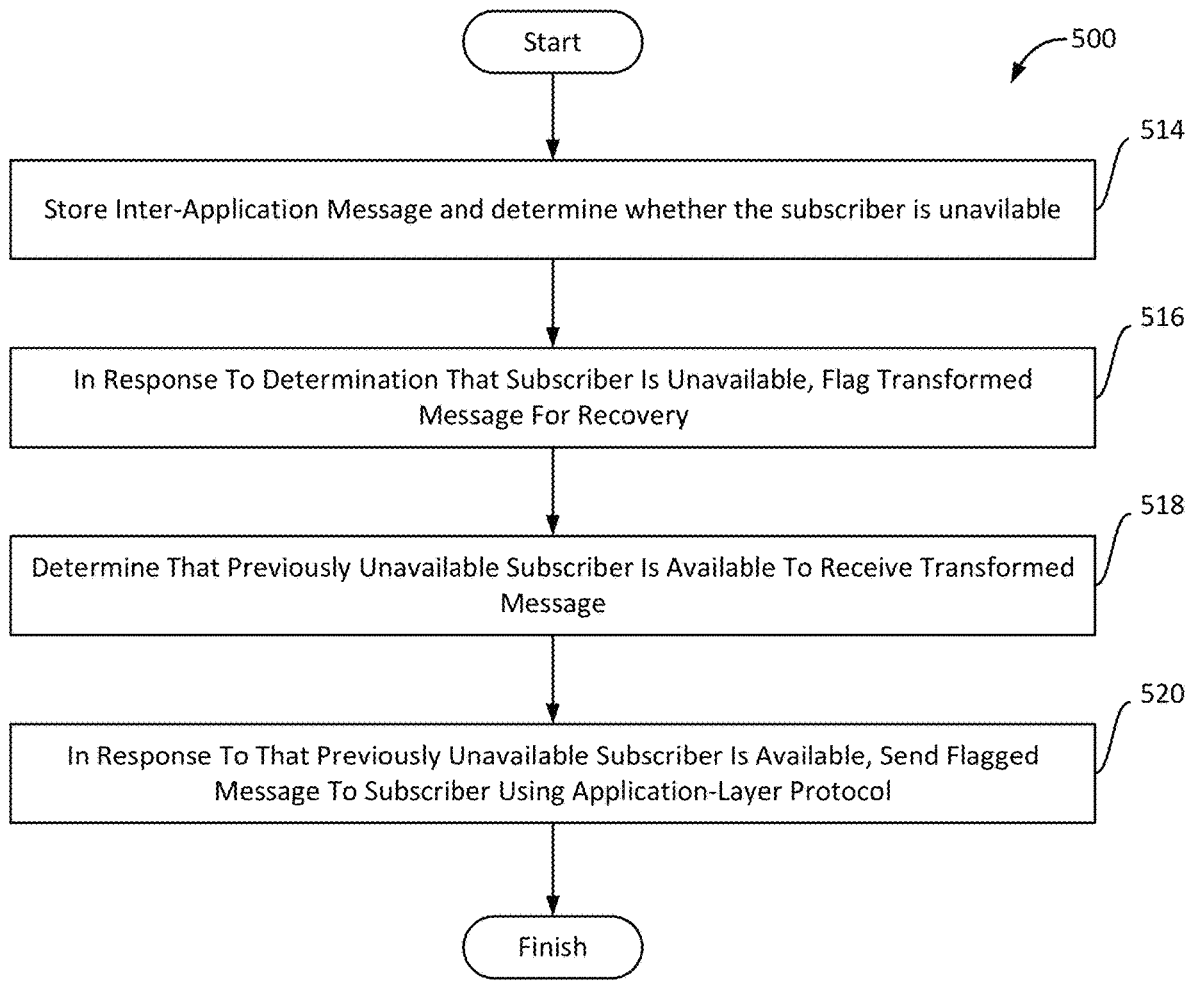

FIGS. 5A, 5B, and/or 5C illustrates a method 500 that facilitates communication of inter-application messages via a message-oriented messaging system, in accordance with one or more implementations. The operations of method 500 presented below are intended to be illustrative. In some implementations, method 500 may be accomplished with one or more additional operations not described, and/or without one or more of the operations discussed. Additionally, the order in which the operations of method 500 are illustrated in FIGS. 5A, 5B, and/or 5C and described below is not intended to be limiting.

In some implementations, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

FIG. 5A illustrates method 500, in accordance with one or more implementations.

An operation 502 may include intercepting an inter-application message from a publisher that is destined for a subscriber. The inter-application message may be formatted and transmitted using a hypertext transfer protocol over a communication network. Operation 502 may be performed by one or more hardware processors configured by machine-readable instructions including a module that is the same as or similar to message interception module 208, in accordance with one or more implementations.

An operation 504 may include converting the intercepted message into a proprietary format of a MOM system. Operation 504 may be performed by one or more hardware processors configured by machine-readable instructions including a module that is the same as or similar to message converting module 210, in accordance with one or more implementations.

An operation 506 may include transmitting a converted message to the MOM system. Operation 506 may be performed by one or more hardware processors configured by machine-readable instructions including a module that is the same as or similar to message transmittal module 212, in accordance with one or more implementations.

An operation 508 may include receiving a MOM-processed message from the MOM system. The MOM-processed message may be converted message after being processed by the MOM system. Operation 508 may be performed by one or more hardware processors configured by machine-readable instructions including a module that is the same as or similar to the message receiving module 214, in accordance with one or more implementations.

An operation 510 may include transforming the MOM-processed message from the MOM-system proprietary format to the hypertext transfer protocol. Operation 510 may be performed by one or more hardware processors configured by machine-readable instructions including a module that is the same as or similar to message transformation module 216, in accordance with one or more implementations.

An operation 512 may include sending the transformed message to the subscriber using the hypertext transfer protocol. Operation 512 may be performed by one or more hardware processors configured by machine-readable instructions including a module that is the same as or similar to the message sending module 218, in accordance with one or more implementations.

FIG. 5B illustrates method 500, in accordance with one or more implementations.

An operation 514 may include storing the inter-application message. The operation 514 also may include, before the sending, a determination whether the subscriber was unavailable to receive the transformed message. Operation 514 may be performed by one or more hardware processors configured by machine-readable instructions including a module that is the same as or similar to message storing module 220 and/or recovery module 222, in accordance with one or more implementations.

An operation 516 may include, in response to the determination that the subscriber is unavailable, flag the transformed message for recovery. Operation 516 may be performed by one or more hardware processors configured by machine-readable instructions including a module that is the same as or similar to recovery module 222, in accordance with one or more implementations.

An operation 518 may include determining that a previously unavailable subscriber is available to receive the transformed message. Operation 518 may be performed by one or more hardware processors configured by machine-readable instructions including a module that is the same as or similar to recovery module 222, in accordance with one or more implementations.

An operation 520 may include in response to the that a previously unavailable subscriber is available, sending the flagged message to the subscriber using the hypertext transfer protocol. Operation 520 may be performed by one or more hardware processors configured by machine-readable instructions including a module that is the same as or similar to recovery module 222, in accordance with one or more implementations.

Figure 5C:
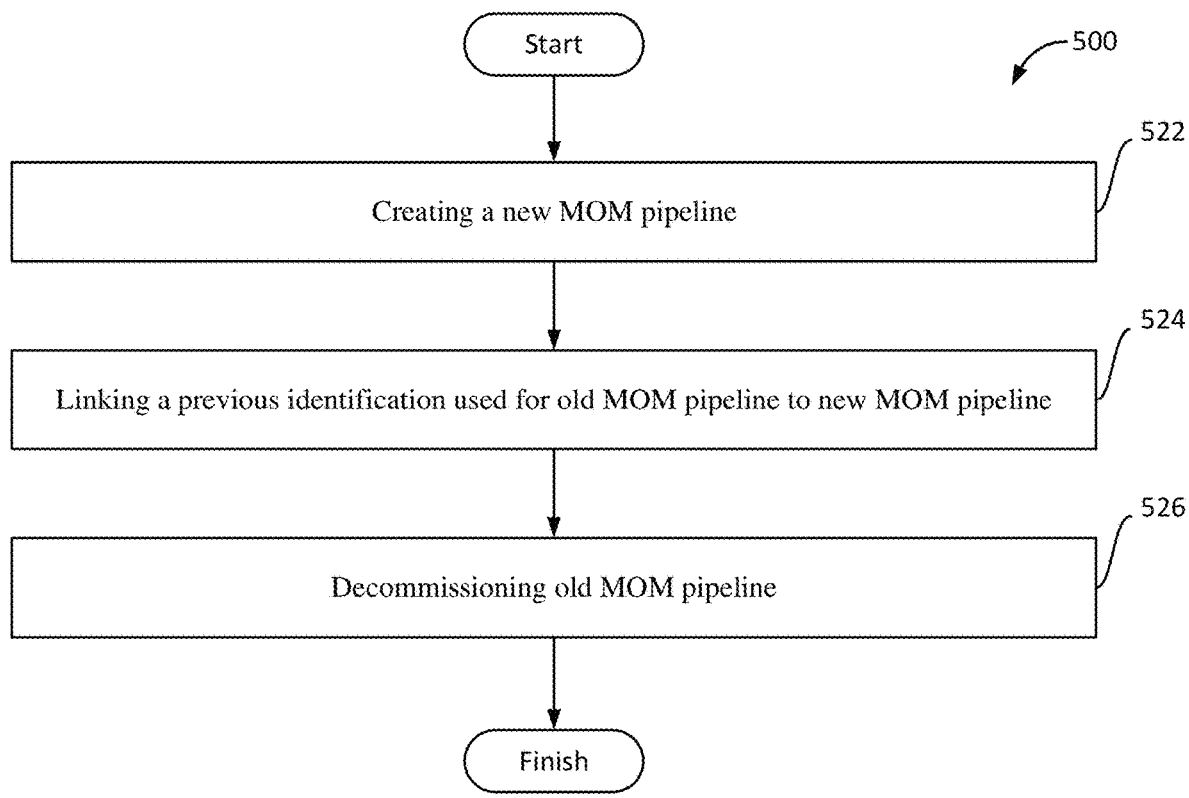

FIG. 5C illustrates method 500, in accordance with one or more implementations.

An operation 522 may include creating a new MOM pipeline. Operation 522 may be performed by one or more hardware processors configured by machine-readable instructions including a module that is the same as or similar to message migration module 224, in accordance with one or more implementations.

An operation 524 may include linking a previous identification used for the old MOM pipeline to the new MOM pipeline. Operation 524 may be performed by one or more hardware processors configured by machine-readable instructions including a module that is the same as or similar to migration module 224, in accordance with one or more implementations.

An operation 526 may include decommissioning the old MOM pipeline.

Operation 526 may be performed by one or more hardware processors configured by machine-readable instructions including a module that is the same as or similar to migration module 224, in accordance with one or more implementations.

Additional and Alternative Implementation Notes

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

In the above description of example implementations, for purposes of explanation, specific numbers, materials configurations, and other details are set forth in order to better explain the present disclosure. However, it will be apparent to one skilled in the art that the subject matter of the claims may be practiced using different details than the examples ones described herein. In other instances, well-known features are omitted or simplified to clarify the description of the example implementations.

The terms "techniques" or "technologies" may refer to one or more devices, apparatuses, systems, methods, articles of manufacture, and/or executable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

These processes are illustrated as a collection of blocks in a logical flow graph, which represents a sequence of operations that may be implemented in mechanics alone, with hardware, and/or with hardware in combination with firmware or software. In the context of software/firmware, the blocks represent instructions stored on one or more non-transitory computer-readable storage media that, when executed by one or more processors or controllers, perform the recited operations.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

As will be appreciated by one skilled in the art, the technology described herein may be embodied as a method, system, or computer program product. Accordingly, embodiments of the technology described herein may be implemented entirely in hardware or a combination of hardware and software (including firmware, resident software, microcode, etc.) These various embodiments may all generally be referred to herein as a "circuit," "module," or "system." Furthermore, the technology described herein may take the form of a computer program product on a computer-usable storage medium having computer-usable program code embodied in the medium.

Any suitable computer-usable or computer-readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the technology described herein may be written in an object-oriented programming language such as Java, Smalltalk, C++ or the like. However, the computer program code for carrying out operations of the technology described herein may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the technology described herein are described with reference to flowchart illustrations and/or block diagrams of methods, apparatus (systems) and computer program products according to embodiments of the technology described herein. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks.

The technology described herein is well adapted to attain the advantages mentioned as well as others inherent therein. While the technology described herein has been depicted, described, and is defined by reference to particular embodiments of the technology described herein, such references do not imply a limitation on the technology described herein, and no such limitation is to be inferred. The technology described herein is capable of considerable modification, alteration, and equivalents in form and function, as will occur to those ordinarily skilled in the pertinent arts. The depicted and described embodiments are examples only, and are not exhaustive of the scope of the technology described herein.

Consequently, the technology described herein is intended to be limited only by the spirit and scope of the appended claims, giving full cognizance to equivalents in all respects.

What is claimed is:

1. A system configured that facilitates communication of inter-application messages via a message-oriented messaging (MOM) system, the system comprising:
   one or more hardware processors configured by machine-readable instructions to:

intercept a transformed message package and inter-application asynchronous message from a publisher that is destined for a subscriber, the transformed message package being formatted and transmitted using different formats and a hypertext transfer protocol over a communication network, wherein format of the package is agnostic to the publisher and the subscriber;

convert the transformed message package and inter-application asynchronous message into a proprietary format of a MOM system, wherein multiple virtualized images of the MOM system are created and stored, from which are selected to create a container by OS-level virtualization;

transmit converted message to the MOM system;

receive a MOM-processed message from the MOM system, wherein the MOM-processed message is converted message after being processed by the MOM system;

transform the MOM-processed message from the MOM-system proprietary format to the hypertext transfer protocol;

provide the MOM-system proprietary format to the publisher and subscriber; and send the transformed message to the subscriber using the hypertext transfer protocol and messaging web service that implements a REST API.

2. The system of claim 1, wherein the one or more hardware processors are further configured by machine-readable instructions to:

store the inter-application asynchronous message, before the sending, determining that the subscriber was unavailable to receive the transformed message;

in response to the determination that the subscriber is unavailable, flag the transformed message for recovery;

determine that a previously unavailable subscriber is available to receive the transformed message;

in response to the that a previously unavailable subscriber is available, send the flagged message to the subscriber using the hypertext transfer protocol.

3. The system of claim 1, wherein the one or more hardware processors are further configured by machine-readable instructions to:

migrate to a new MOM system from the MOM system by OS-level virtualization generating a new pipeline for messages;

decommission the MOM system by OS-level virtualization deleting the pipeline for messages of the MOM system.

4. The system of claim 1 further comprising a database to store parameters related to the MOM system.

5. The system of claim 1, wherein intercepting and sending are performed by representational state transfer web services.

6. The system of claim 1, performed by system utilizing platform as a service that uses operating system-level virtualization.

7. A method that facilitates communication of inter-application messages via a message-oriented messaging (MOM) system, the method comprising:

intercepting a transformed message package and inter-application asynchronous message from a publisher that is destined for a subscriber, the transformed message package being formatted and transmitted formatted using different formats and a hypertext transfer protocol over a communication network, wherein format of the package is agnostic to the publisher and the subscriber;

converting the transformed message package and inter-application asynchronous message into a proprietary format of a MOM system, wherein multiple virtualized images of the MOM system are created and stored, from which are selected to create a container by OS-level virtualization;

transmitting converted message to the MOM system;

receiving a MOM-processed message from the MOM system, wherein the MOM-processed message is converted message after being processed by the MOM system;

transforming the MOM-processed message from the MOM-system proprietary format to the hypertext transfer protocol;

providing the MOM-system proprietary format to the publisher and subscriber; and sending the transformed message to the subscriber using the hypertext transfer protocol and messaging web service that implements a REST API.

8. The method of claim 7, further comprising:

storing the inter-application message; before the sending, determining that the subscriber was unavailable to receive the transformed message;

in response to the determination that the subscriber is unavailable, flag the transformed message for recovery;

determining that a previously unavailable subscriber is available to receive the transformed message;

in response to the determination that a previously unavailable subscriber is available, sending the flagged message to the subscriber using the hypertext transfer protocol.

9. The method of claim 7, further comprising:

migrating to a new MOM system by OS-level virtualization generating a new pipeline for messages;

decommissioning the MOM system by OS-level virtualization deleting the pipeline for messages of the MOM system.

10. The method of claim 7 further comprising storing parameters related to the MOM system in a database.

11. The method of claim 7, wherein intercepting and sending are performed by representational state transfer web services.

12. The method of claim 7, performed by system utilizing platform as a service that uses operating system-level virtualization.

13. A computing platform configured that facilitates communication of inter-application messages via a message-oriented messaging (MOM) system, the computing platform comprising:

a non-transient computer-readable storage medium having executable instructions embodied thereon; and one or more hardware processors configured to execute the instructions to:

intercept a transformed message package and inter-application asynchronous message from a publisher that is destined for a subscriber, the transformed message package being formatted and transmitted using different formats and a hypertext transfer protocol over a communication network, wherein format of the package is agnostic to the publisher and the subscriber;

convert the transformed message package and inter-application asynchronous message into a proprietary format of a MOM system, wherein multiple virtualized images of the MOM system are created and stored, from which are selected to create a container by OS-level virtualization;

transmit converted message to the MOM system;

receive a MOM-processed message from the MOM system, wherein the MOM-processed message is converted message after being processed by the MOM system;

transform the MOM-processed message from the MOM-system proprietary format to the hypertext transfer protocol;

provide the MOM-system proprietary format to the publisher and subscriber; and send the transformed message to the subscriber using the hypertext transfer protocol and messaging web service that implements a REST API.

14. The computing platform of claim 13, wherein the one or more hardware processors are further configured by the instructions to:

store the inter-application asynchronous message, before the sending, determining that the subscriber was unavailable to receive the transformed message;

in response to the determination that the subscriber is unavailable, flag the transformed message for recovery;

determine that a previously unavailable subscriber is available to receive the transformed message;

in response to the that a previously unavailable subscriber is available, send the flagged message to the subscriber using the hypertext transfer protocol.

15. The computing platform of claim 13, wherein the one or more hardware processors are further configured by the instructions to:

migrate to a new MOM system by OS-level virtualization generating a new pipeline for messages;

decommission the MOM system by OS-level virtualization deleting the pipeline for messages of the MOM system.

16. The computing platform of claim 13 further comprising a database to store parameters related to the MOM system.

17. The computing platform of claim 13, wherein intercepting and sending are performed by representational state transfer web services.

18. The computing platform of claim 13, performed by system utilizing platform as a service that uses operating system-level virtualization.

19. The system of claim 1 further comprising machine-readable instructions to determine if the subscriber receives the transformed message and resending the transformed message when the subscriber is available.

20. The method of claim 7 further comprising determining if the subscriber receives the transformed message and resending the transformed message when the subscriber is available.

* * * * *